(12) United States Patent
Marshall

(10) Patent No.: US 6,876,487 B1
(45) Date of Patent: Apr. 5, 2005

(54) ANY-TO-ANY ALL-OPTICAL WAVELENGTH CONVERTER

(75) Inventor: Larry R. Marshall, Mountain View, CA (US)

(73) Assignee: Lightbit Corporation, Inc., Mountain View, CA (US)

(*) Notice: Subject to any disclaimer, the term of this patent is extended or adjusted under 35 U.S.C. 154(b) by 216 days.

(21) Appl. No.: 10/098,166

(22) Filed: Mar. 14, 2002

Related U.S. Application Data

(60) Provisional application No. 60/275,915, filed on Mar. 14, 2001, and provisional application No. 60/275,913, filed on Mar. 14, 2001.

(51) Int. Cl.$^7$ .............................. G02F 1/365; G02B 6/34
(52) U.S. Cl. ........................ 359/332; 359/326; 385/37; 385/122
(58) Field of Search ................................ 359/326–332; 385/37, 122; 372/21, 22

(56) References Cited

U.S. PATENT DOCUMENTS

| | | | |
|---|---|---|---|
| 5,434,700 A | * | 7/1995 | Yoo ............................. 359/332 |
| 5,550,671 A | * | 8/1996 | Simpson et al. ............. 359/326 |
| 6,046,841 A | * | 4/2000 | Mahgerefteh et al. ....... 359/326 |
| 6,304,585 B1 | * | 10/2001 | Sanders et al. ............. 359/326 |
| 6,344,921 B1 | * | 2/2002 | Galvanauskas et al. ..... 359/332 |
| 6,529,314 B1 | * | 3/2003 | Shukunami et al. ......... 359/332 |
| 2002/0114059 A1 | * | 8/2002 | Bonfrate et al. ............. 359/332 |
| 2003/0142387 A1 | * | 7/2003 | Hakimi et al. ............... 359/326 |

FOREIGN PATENT DOCUMENTS

| | | | | |
|---|---|---|---|---|
| JP | 03296729 A | * | 12/1991 | .............. G02F/1/39 |
| JP | 10206917 A | * | 8/1998 | .............. G02F/1/37 |

OTHER PUBLICATIONS

"2mW CW singlemode operation of a tunable 1550 nm vertical cavity surface emitting laser with 50 nm tuning range", Vakshoo et al., Electronics Letters May 27, 1999, vol. 35, No. 11.*

* cited by examiner

Primary Examiner—John D. Lee
(74) Attorney, Agent, or Firm—Ritter, Lang & Kaplan LLP

(57) ABSTRACT

All-optical wavelength converters based upon difference frequency generation (DFG) in optical chips with periodically poled materials are presented. Tunable continuous wave (CW) laser sources and various arrangements are made with the optical input signals in different ITU channels. In some arrangements the laser source(s) acts as the pump for the conversion of the input signals to different wavelengths. In other arrangement, the amplified input signals acts as a pump with the laser source in the role of the input signal. The net effect is that input signals are converted to different wavelengths. One-to-any, any-to-one, and any-to-any wavelength converters are described. Simultanenous conversation can also be preformed so that bands of signals may also be converted.

22 Claims, 13 Drawing Sheets

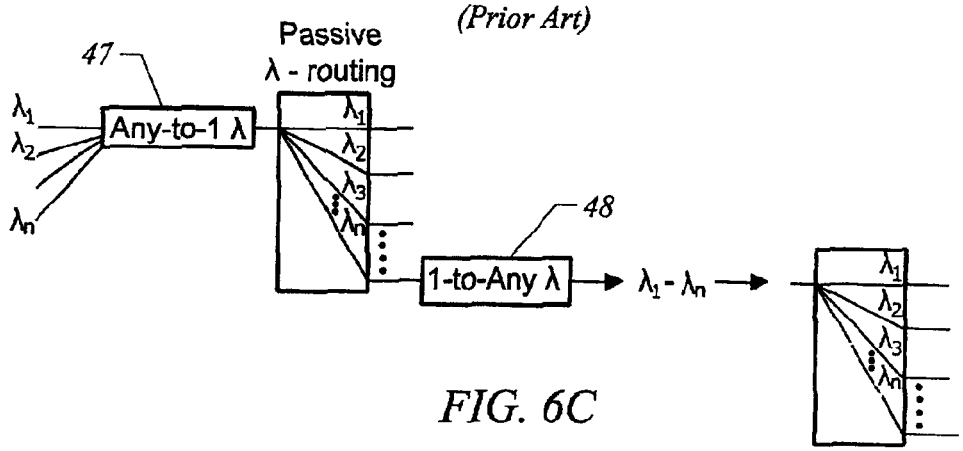
FIG. 6B
(Prior Art)
FIG. 6C
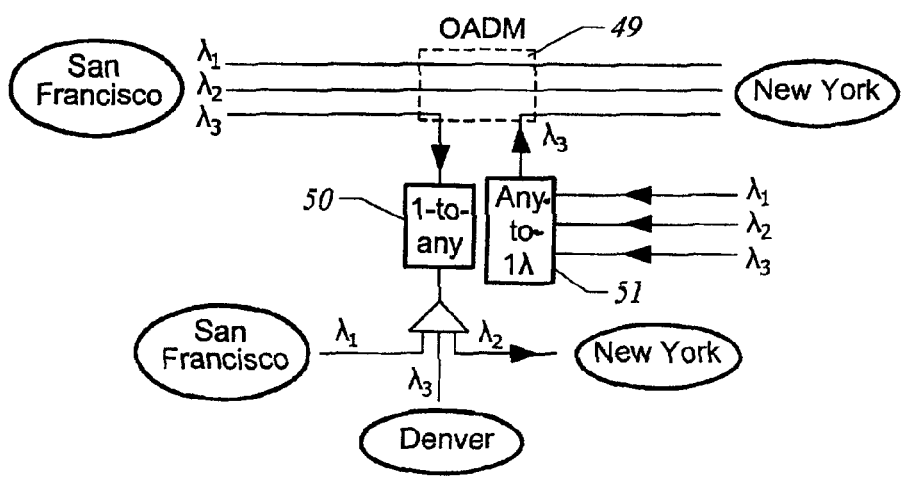
FIG. 6D

US 6,876,487 B1

ANY-TO-ANY ALL-OPTICAL WAVELENGTH CONVERTER

CROSS-REFERENCES TO RELATED APPLICATIONS

This application claims priority from U.S. Provisional Patent Application No. 60/275,915, entitled "Any to Any All-optical Wavelength Converter," and U.S. Provisional Patent Application No. 60/275,913, entitled "Pure Optical 3R Device," both filed on Mar. 14, 2001; the disclosures of which are hereby incorporated by reference in its entirety.

BACKGROUND OF THE INVENTION

All-optical wavelength converters based upon difference frequency generation (DFG) in periodically-poled materials have been described by Chou et al., Optics Letters, vol. 23, pp. 1004–1006, July 1998; and Chou et al., Optics Letters, vol. 24, pp. 1157–1159, August 1999, to which reference is periodically made.

An optical parametric amplifier (OPA) is a more general case of a DFG. From a given pump wavelength, an OPA produces two outputs of different wavelengths whose energies sum to equal the energy of the pump, such as described in U.S. Pat. No. 5,181,211, entitled "Eye-Safe Laser System," which issued to Kasinski et al. For example, a 730 nm pump can generate a signal at 1310 nm and an idler at 1648 nm. FIGS. 1A and 1B illustrates the arrangement and operation of an OPA. In the block diagram of FIG. 1A, the OPA is formed by two parts, a DFG portion and a second harmonic generation portion (SHG) portion, which doubles an ITU (International Telecommunications Union) pump frequency to an equivalent wavelength of $\lambda_p/2$ from which the DFG portion generates an amplified input signal and idler. One can think of an OPA as follows—in frequency space, the pump at frequency $\omega_p$ forms a "mirror" at frequency $\omega_p/2$, and the signal and idler are sidebands or "reflected images" equally spaced on either side of the central pump frequency $\omega_p/2$, as depicted schematically in FIGS. 1A and 1B. In wavelength space as shown in FIG. 1B, the signal and idler wavelengths "mirror" around pump wavelength $\lambda_p$.

For telecommunications applications, in which CW (continuous wave) or weakly modulated signals are used without significant power, the ideal medium for the OPA is a periodically poled substance, such as periodically poled lithium niobate (PPLN), as described by Chou et al., Optics Letters, vol. 23, pp. 1004–1006, July 1998; and Chou et al., Optics Letters, vol. 24, pp. 157–1159, August 1999. Alternate materials include periodically poled lithium tantalate, or a periodically grown semiconductor material, such as GaAs or InGaAs. The periodic poling achieves non-critical phase matching for a wide range of wavelengths, thereby maximizing the nonlinear gain for even weak CW signals.

The devices described in these papers demonstrate broad acceptance of input signals enabling conversion of a wide range wavelengths, even simultaneously. However, these prior art device are limited to at most four possible wavelength shifts within a single device, and for each additional shift increasing losses are suffered (eg., 2× loss for 2 shifts, 4× loss for 4 shifts). These renders the possibility of an any-to-any wavelength converter remote. Also, the amount of shift varies for a given pump, depending upon the spectral separation of the input signal and pump. This prevents shifting a single channel to any other channel. Even tunable lasers do not enable such an any-to-any device, since only 4 shifts could be allowed in a given chip, far less than the 80 ITU channels that exist today.

In contrast, the present invention solves these problems, and in a sense, reverses what has been done in the prior art to create new functionality and performance from nonlinear optical wavelength converters.

SUMMARY OF THE INVENTION

The present invention provides for all-optical wavelength conversion of telecommunications data channels independent of bit-rate or protocol. It also provides signal cleanup and regenerative capability.

The present invention provides for a one-to-any wavelength converter having an optical chip with at least one waveguide; a CW laser source, an input to the waveguide; a second input port accepting an external optical signal, modulated with data; and at least one periodically poled region, within the waveguide, with at least one resonant wavelength matched to that of the external optical signal such that the external optical signal acts as a pump for wavelength conversion of the CW laser source. The laser source is preferably tunable.

The present invention also provides for an any-band-to-any-band wavelength converter having a plurality of waveguides with a plurality of poled regions with a plurality of different resonant wavelengths; an optical switch which selectively directs both a CW pump source and the external optical signal into the waveguide with the poled region whose resonant wavelength matches that required to achieve a predetermined optical shift; an input port accepting a plurality of external optical signals simultaneously; and an output port producing a plurality of converted optical signals simultaneously.

The present invention provides for a one-to-any wavelength converter having an optical chip with two waveguides forming a Mach-Zehnder interferometer, a CW laser source, an input port to the waveguide; a second input port accepting an external optical signal, modulated with data; and at least 1 periodically poled region, within one arm of the Mach-Zehnder, with at least 1 resonant wavelength matched to that of the external optical signal such that the external optical signal acts as a pump for wavelength conversion of the CW laser. The CW laser source is preferably tunable.

The present invention provides for an any-to-one wavelength converter having comprising: a plurality of waveguides with a plurality of poled regions with a plurality of different resonant wavelengths therein; a plurality of external optical filters that selectively direct an external optical signal into the waveguide containing the poled region that is resonant with the external optical signal; and an optical switch which selectively directs both a CW pump source and the external optical signal into the waveguide with the poled region whose resonant wavelength matches that required to achieve a predetermined optical shift to a fixed output wavelength.

The present invention further provides for an any-to-any wavelength converter having a tunable CW laser source operating as a pump to energize the optical chip; an input port accepting an external optical signal, modulated with data; a plurality of waveguides, joined together end to end to form a continuous waveguide in the optical chip; a plurality of poled regions with a plurality of different resonant wavelengths; and an external controller which tunes the wavelength of the CW laser source to the resonance wavelength required to achieve a pre-determined shift of the external input signal to the required output wavelength.

The present invention also provides for an any-to-any wavelength converter having an optical chip with two waveguides forming a Mach-Zehnder interferometer; a first CW laser source, input to the waveguide; a second input port accepting an external optical signal, modulated with data; at least one periodically poled region within one arm of the Mach-Zehnder interferometer with at least one resonant wavelength matched to that of the first CW laser source such that the first CW laser source acts as a pump for wavelength conversion of the external optical signal; a second optical chip with a second poled region with the same resonance wavelength as the first; and a second CW laser source, input to the second optical chip, along with the output of the first optical chip, such that the output of the first chip acts as a pump for the second chip to convert the second CW laser source to a new wavelength. At least one of the CW laser sources is tunable.

The present invention also provides for an any-to-any wavelength converter having an optical chip with two waveguides forming a Mach-Zehnder interferometer; at least one periodically poled region within one arm of the Mach-Zehnder interferometer with at least one resonant wavelength; a first CW laser source producing the second harmonic wavelength required to energize the poled region, input to the waveguide, such that the first CW laser source acts as a direct pump for wavelength conversion of the external optical signal; a second input port accepting an external optical signal, modulated with data; a second optical chip with a second poled region with the same resonance wavelength as the first; and a second CW laser source, input to the second optical chip, along with the output of the first optical chip, such that the output of the first chip acts as a pump for the second chip to convert the second CW laser source to a new wavelength.

BRIEF DESCRIPTION OF THE DRAWINGS

FIG. 6B is a routing table of the FIG. 6A wavelength routing node; FIG. 6C illustrates how a one-to-any wavelength converter according to the present invention is adapted to the output ports of FIG. 6A routing node or switch; FIG. 6D illustrates how a one-to-any wavelength converter according to the present invention is adapted into optical add/drop multiplexer network arrangement;

DESCRIPTION OF THE SPECIFIC EMBODIMENTS

The present invention provides for many embodiments and aspects of wavelength converters of the present invention. For purposes of organization and ease of explanation, these embodiments and aspects are separated and headed with subtitles, but should not be considered as limiting the present invention.

Scalable Chip Wavelength Converter

Figure 2A:
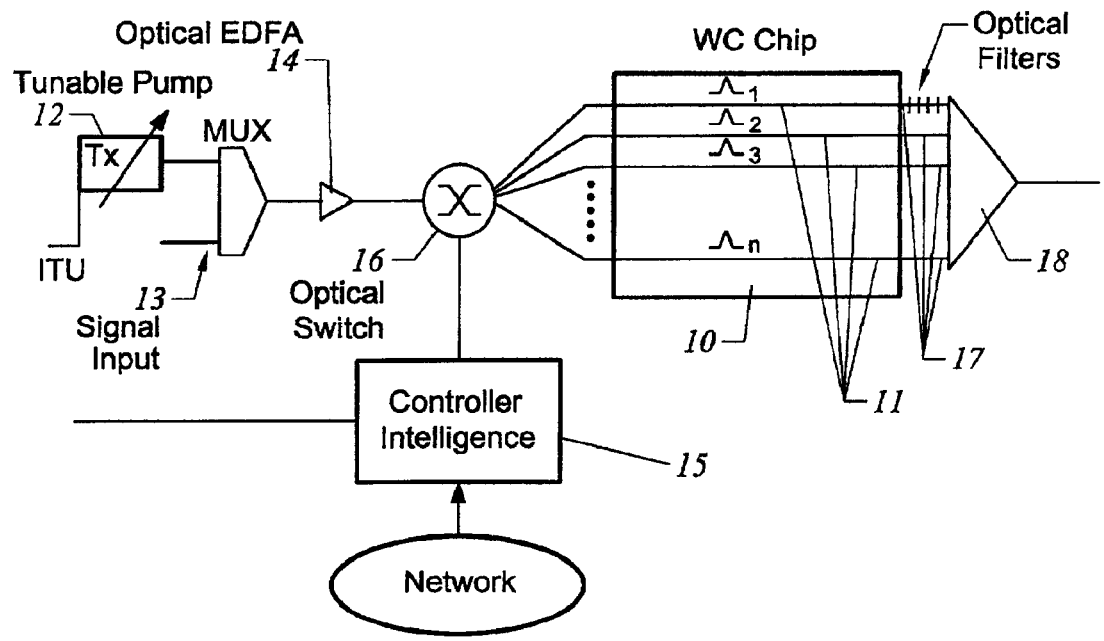
FIG. 2A is a block diagram of a wavelength converter connected with network control with a single chip converter, according to one embodiment of the present invention.

In order to scale functionality of single chip devices for wavelength conversion, one embodiment of the present invention is illustrated in the context of an optical network. In this embodiment the wavelength converter has multiple waveguides 11 on a single chip 10, as shown in FIG. 2A. These waveguides can be so-called single channel, or multiple channel (as described in the Chou et al. articles cited above), depending upon the loss level that can be tolerated. Each waveguide has gratings (not shown) which are fabricated with a period $\Lambda_n$ to be resonant with a certain pump wavelength $\lambda_n$, and may include frequency doubling of the pump signal to enable standard ITU grade telecommunication transmitters in the C-band, i.e., the center band of the ITU-defined WDM (Wavelength Division Multiplexing) or DWDM (Dense WDM) grid of optical channels, to be employed as pumps (which are then doubled into the ~780 nm band). A tunable diode laser 12 is employed as a pump source, and is multiplexed together with the input signal channel which can be any ITU grid wavelength. An optional EDFA (erbium-doped fiber amplifier) 14 amplifies the pump and input signals together to maximize the conversion efficiency of the wavelength converter.

A network controller (not shown) indicates the channel which must be shifted, and to which channel the shift is required, then directs this channel into the wavelength converter (WC) chip 10. A controller 15 for the described WC receives this data from the network and selects the appropriate pump wavelength to achieve the required shift. This pump wavelength is the spectral midpoint of the input signal wavelength and the requires output wavelength. The controller 15 also drives an optical switch 16 which directs the pump and signal into the appropriate waveguide 11 for the selected pump wavelength.

The output of each waveguide 11 is coupled back into a fiber 18 and each fiber 17 is combined by a DWDM multiplexer 18 into a single output. The individual fibers 17 can be filtered so as to reject the pump wavelength any channel on the signal input side of the pump wavelength. Alternately, such filtering can occur in the DWDM multiplexer 18. The filtering removes the original channel and leaves only the converted channel. The fiber coupling can be achieved using silicon V-groove technology, such as supplied by Wave Optics, Inc. of Mountain View, Calif., in which a large number of fibers are precisely spaced in a linear array of V-grooves in a silicon substrate. The silicon substrate can then be butt-coupled to the WC chip 10 to align each waveguide 11 with its corresponding fiber 17.

Figure 2B:
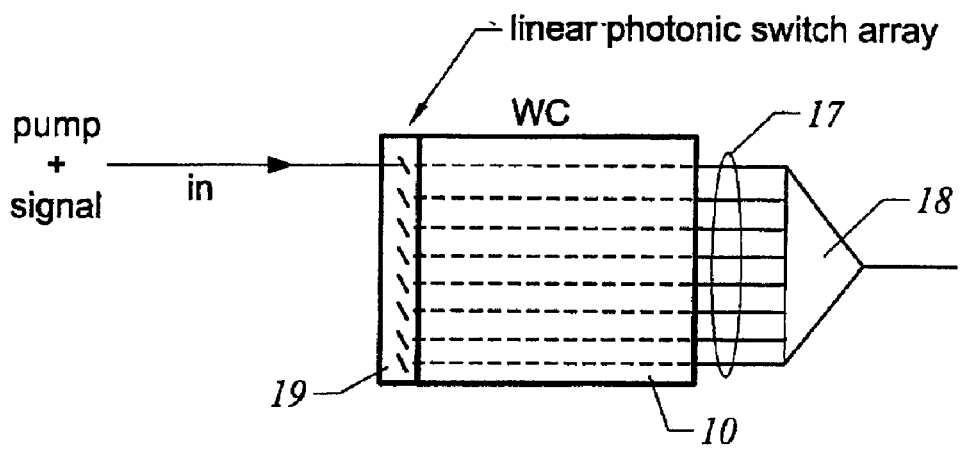
FIG. 2B illustrates an exemplary optical switch for the FIG. 2A wavelength converter.

FIG. 2B shows an exemplary device which might be used for the optical switch 16 of FIG. 2A. A linear MEMs (microelectro-mechanical) switch of the type made by Silicon Light Machines of Sunnyvale, Calif., receives one input and switches it to one of many outputs using MEMs mirrors aligned on a linear array. This so-called 2D MEMs structure offers a lower cost architecture than 3D MEMs, yet it still achieves requirement of switching one waveguide into a choice of many waveguides.

Switchless Wavelength Converters

Figure 3A:
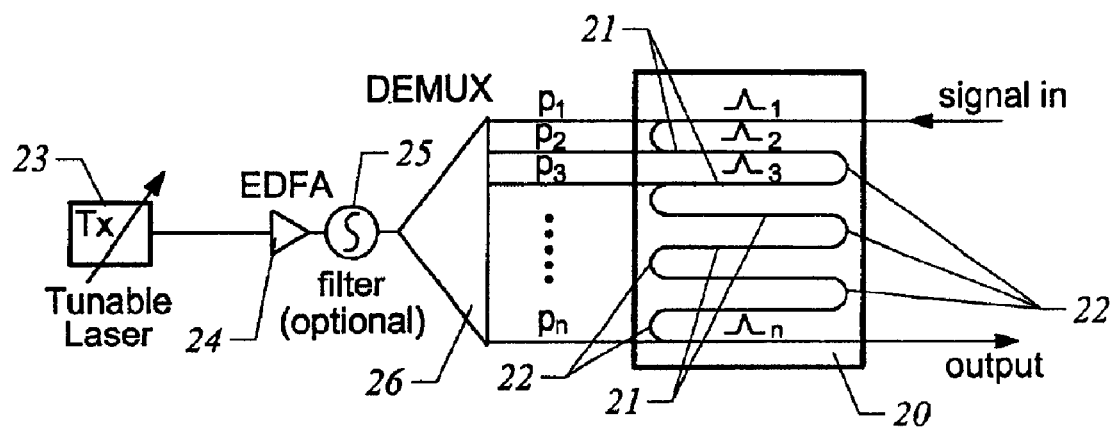
FIG. 3A is a block diagram of a switchless wavelength converter having a chip with interconnected waveguides according to an embodiment of the present invention.

In another embodiment of the present invention, as shown in FIG. 3A, an array of the waveguides 21 on a chip 20 is joined by a series of tight radius bends 22 so as to form a continuous waveguide containing a large number of waveguide gratings matched for various pump wavelengths. The pump laser 23 is tunable and amplified by an EDFA 24, and a WDM demultiplexer 26 directs a particular pump wavelength into the appropriate waveguide 21 with its matched grating. The signal propagates through the entire connected waveguide interacting only with the grating that is pumped. Alternatively, the input signal can be demultiplexed to physically inject it into the appropriate waveguide, and the pump can pass through the entire connected waveguide array, interacting only with its resonant grating as determined by the pump tuning.

Figure 3B:
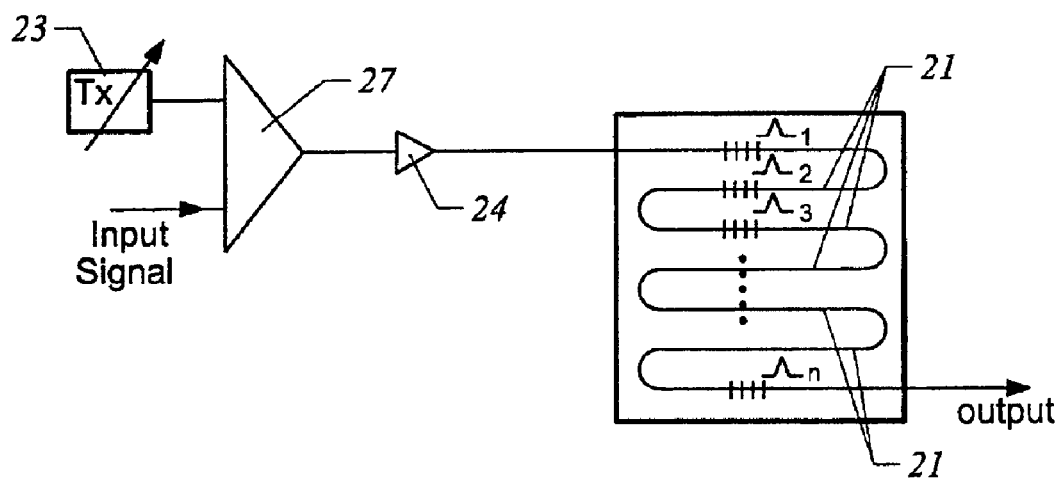
FIG. 3B is a block diagram of another switchless wavelength converter with a chip with interconnected waveguides, according to an embodiment of the present invention.

Another embodiment of the present invention, as illustrated in FIG. 3B, the chip 20 of FIG. 3A is used, along with the other elements, the tunable pump laser 23 and EDFA 24. In this case, both pump and input signal are combined by a multiplexer 27 and amplified by the EDFA 24 to pass through the entire connected waveguide series of the chip 20. The pump is tuned to interact with the appropriate grating in the selected waveguide 21 for the desired wavelength shift.

In these embodiments, the pump is tuned to select the appropriate shift as required by the network controller. These embodiments have the advantage of being passive structures without optical switches, and require only a single fiber coupling onto and off the chip 20. The gratings for frequency doubling and DFG are integrated into each of the single waveguides 21 (between the loops 22) and can even be overlapped to accommodate multiple pumps and signals using the Fourier synthetic grating technique described in the previously cited article, Chou et al., *Optics Letters*, vol. 24, pp. 1157–1159, August 1999.

Figure 4:
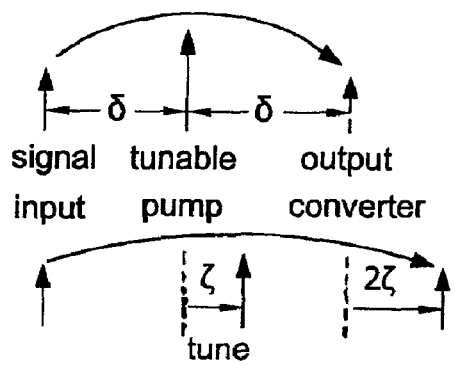
FIG. 4 is a representative illustration of the operational tuning speed of the FIGS. 3A and 3B wavelength converters in comparison to the tuning speed of the pump laser.

Furthermore, this type of converter is inherently faster than a tunable laser in operation. For example, since the present invention need only tune half way between the input channel and the desired output channel in order to shift, the tuning speed of the tunable laser is accelerated by a factor of 2, as illustrated graphically in FIG.4. If the pump Bilk wavelength is tuned by an amount $\epsilon$, then the converted output is tuned by $2\epsilon$. Therefore, the present invention is always be a factor of 2 faster in tuning than the tunable laser itself. This is important in a network where speed is critical, and may make the difference between the ability of electronics to keep up with all-optical switching or not.

Single Waveguide Wavelength Converter

Figure 5A:
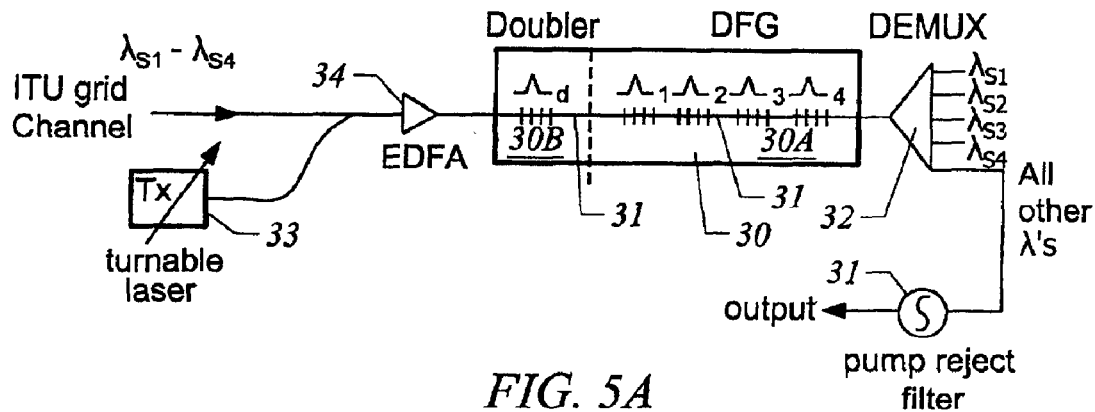
FIG. 5A is a block diagram of a wavelength converter in which the roles of input signal(s) and tunable pump signal are reversed, according to still another embodiment of the present invention.

In accordance to another embodiment of the present invention shown in FIG. 5A, the roles of the input signal and pump are reversed. A wavelength converter chip 30 has a single waveguide which passes through two portions of the chip. A first portion 30A is a DFG portion described previously and a second portion 30B is a frequency doubling portion (by SHG), also described above. See FIG. 1A. In the present wavelength converter, the input signal is amplified by an EDFA 34 and frequency doubled in the portion 30B of the wavelength converter chip 30, to act as the pump. The output of a CW tunable laser 33 serves as input as the signal wavelength. In this embodiment the waveguide grating in the DFG portion 30A is poled to match a given signal wavelength. Alternately multiple gratings (illustrated in FIG. 5A) can be poled in a single waveguide, as described in Chou et al., *Optics Letters*, vol. 24, pp. 1157–1159, August 1999, providing losses are acceptable. A grating must be formed to match a given ITU grid channel. The input signals of that channel are amplified and used to pump the grating.

As described, the CW tunable laser 33 acts input. Since the nonlinear gain vanishes when the pump (ITU channel signal) is turned off, the wavelength conversion of the CW pump 33 is also turned on and off. Because the input ITU channel is frequency doubled to act as a pump, there is a nonlinear gain dependence which suppresses noise and enhances the contrast ratio between the digital "on" and "off" states, or peaks and troughs of the telecom signals.

Thus this embodiment performs not only wavelength conversion but also has noise suppression.

Since the CW input signal is now tunable, wavelength conversion to any channel is achieved simply as follows: If the desired shift is to a channel A nm shorter than the input ITU channel, then the CW tunable laser is tuned to be A nm longer than the input ITU channel. The CW pump then "mirrors around" the pump to the desired new channel. The modulation is transferred from CW tunable laser to the new channel directly through the nonlinear gain function. The response time of nonlinear gain is very fast, on the timescale of the squeezing of the electron cloud. As a result, the temporal data stream is translated from the input channel to the shifted output wavelength with negligible change. This eliminates the requirement of OEO conversion to employ a tunable laser to change channels by regenerating the signal and driving a modulator to re-encode the data on the new optical channel.

As stated previously, the speed of the tunable laser is accelerated by a factor of 2 by virtue of the device architecture; thus the tuning speed for the input signals is doubled over that of the tunable laser.

The devices described in the previous embodiments are also applicable to this one, however, the grating periods $\Lambda_n$ are chosen to be resonant with a certain ITU grid wavelength (formerly signal input) $\lambda_n$, while the pump is tuned to produce the desired shifted channel output wavelength.

Figure 5B:
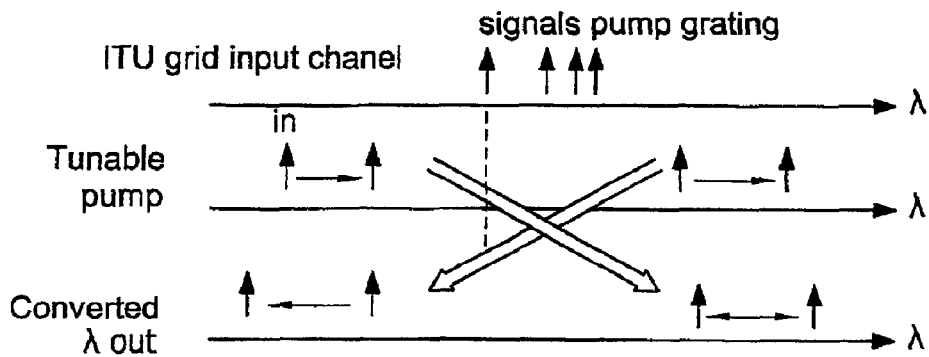
FIG. 5B illustrates the operation of the FIG. 5A wavelength converter.

FIG. 5B shows the dynamic operation of this embodiment which accommodates a wide range of tunable inputs and outputs. The tunable laser can be tuned to the shorter wavelengths to shift the ITU grid channel to longer wavelengths and vice-versa.

Multiple Channel Shifting Wavelength Converter

The previously described embodiments of the present invention can also be used to shift more than one channel simultaneously, thus shifting a band of wavelengths together. This type of application includes shifting between the major propagation bands in an optic network; i.e., shifting between C(center wavelength ), L (long wavelength), and S (short wavelength)-bands.

Figure 5C:
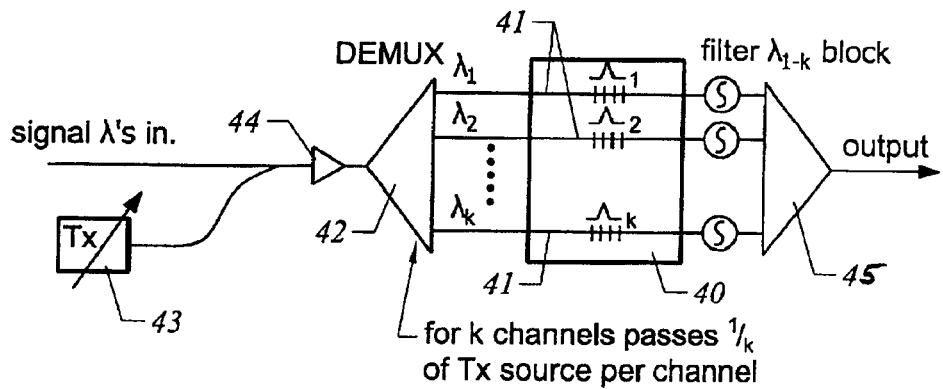
FIG. 5C is a block diagram of a wavelength converter which shifts multiple input signals simultaneously.

FIG. 5C shows an embodiment using the ITU grid channels as pumps, which enables simultaneous conversion of multiple input channels. A DWDM demultiplexer 41 is employed to separate the ITU grid channel signals into multiple waveguides 41 containing their appropriate resonant gratings which they then pump. Each waveguide 41 contains a single grating in order to avoid mixing of multiple input signals. The demultiplexer 42 also shifts a fraction of the signals from a tunable source 43 into each waveguide 41 to act as the signal input which is then shifted to the new output wavelength. The shifted output signals are combined by a DWDM multiplexer 45.

One-to-Any Wavelength Converter

The preceding embodiment, shown in FIG. 5A, is a general example of a "oneto-any wavelength" converter. The "one-to-any" converter embodiment, shown in FIG. 5A simply employs a single grating matched to the ITU grid channel which pumps the grating and "mirrors" the tunable pump wavelength about it to produce a new output wavelength. The modulation of the input signal is transferred to the output wavelength through modulation of the nonlinear gain.

This embodiment enables the network to employ a number of "all-optically tunable" channels. For simplicity, the wavelengths of these channels are fixed enabling single fixed gratings to be employed for resonance with the signal channels. The advantage of this embodiment lies in its ability to employ a single grating and single pump to turn a fixed channel into a fully tunable channel without recourse to OEO (optical/electrical/optical) conversion.

Figure 6A:
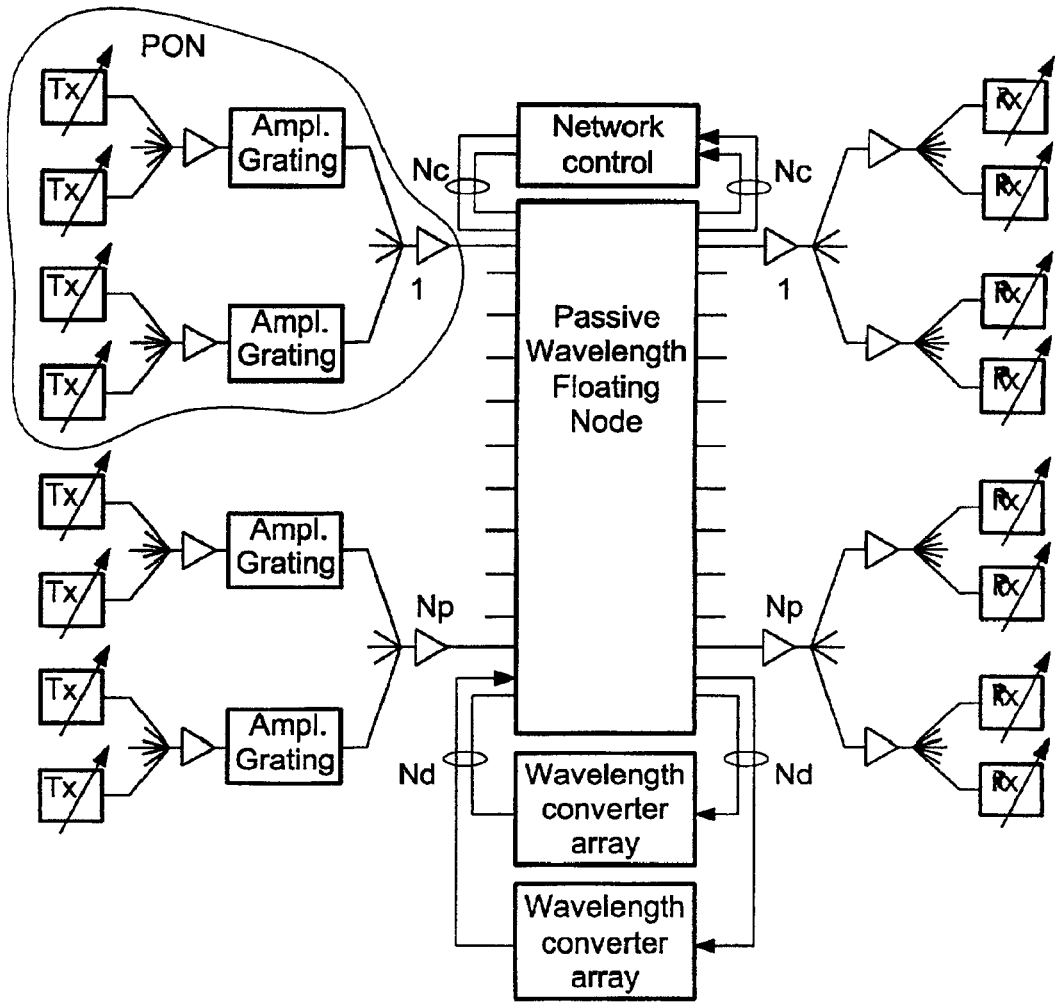
FIG. 6A illustrates the architecture of a wavelength routing node in an optical network, described in the prior art.

FIGS. 6A and 6B shows the use of a passive optical cross connect which routs channels to various ports determined by their wavelength. This architecture has been described by Binetti et al, *J. Lightwave Technology*, vol. 18, no. 2, February 2000, pp. 144–153. If the output of such a port at $\lambda_n$ is considered, the one-to-any wavelength converter enables the output of that port to be reconfigured to shift to any port of the subsequent optical cross connect (OXC). This is shown in FIG. 6C where the one-to-any wavelength converter of the present invention is illustrated by the box diagram 48.

FIG. 6D shows the use of the one-to-any wavelength converter of the present invention as part of an optical add/drop multiplexer OADM (optical add/drop multiplexer) arrangement. The illustrated OADM 49 strips out channel 3 from a cross country cable between San Francisco and New York, for example. The one-to-any converter 50 then turns channel 3 into any other wavelength which is routed, by wavelength, to either San Francisco, Denver, or New York.

Any-to-One Wavelength Converter

Figure 7A:
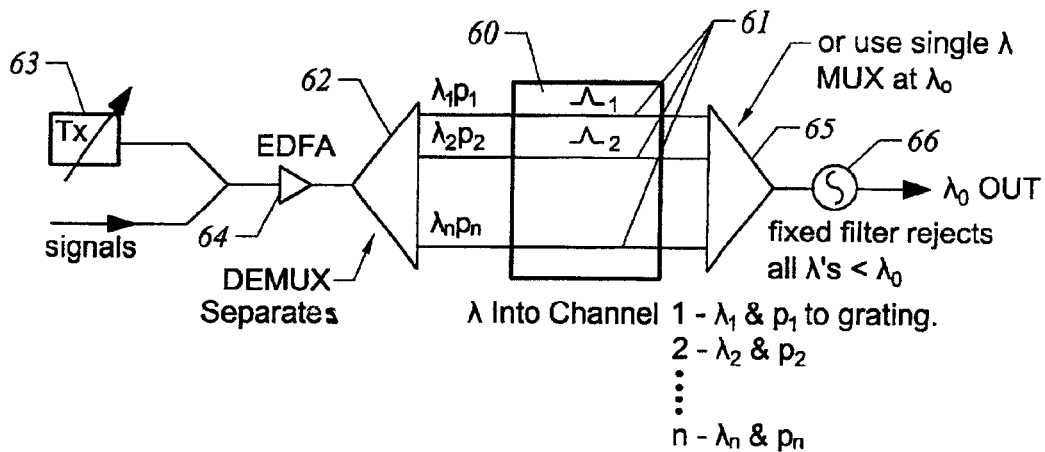
FIG. 7A is a block diagram of an any-to-one wavelength converter according to one embodiment of the present invention.
Figure 7B:
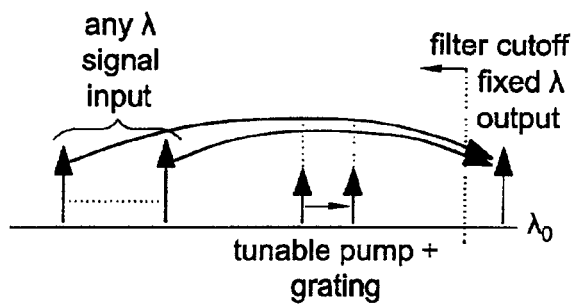
FIG. 7B illustrates the operation of the FIG.7A wavelength converter.

This embodiment of the present invention is the converse of the previously described embodiment, and enables enhanced optical network flexibility. Any signal channel can be switched to a fixed port, and the output of that port is always a fixed wavelength, say for example, $\lambda_0$. FIG. 7A shows this embodiment and the relevant input signal ($\lambda_1$–$\lambda_n$) and pump ($\lambda_{p1}$–$\lambda_{pn}$) wavelengths. An advantage of this architecture, is that filtering the inputs from the output is very simple; a band pass filter 66 rejects all wavelengths shorter than the output wavelength $\lambda_0$. A DWDM demultiplexer 62 separates the signal and pump wavelengths into waveguides 61 which the appropriate grating periods to match the pump wavelengths.

Optical network arrangements and architectures which use these any-to-one wavelength converter are shown in FIGS. 6C and 6D, along with the one-to-any wavelength converters. While the one-to-any wavelength converter operates on a single channel, the any-to-one wavelength converter takes a variety of input wavelengths and directs them all to the same output channel or port of the OXC of FIG. 6A. In the network example shown in FIG. 6D, signals at wavelengths $\lambda_1$–$\lambda_3$ from San Francisco, Denver, and New York are shifted to wavelength$\lambda_3$, and routed to New York.

Figure 8A:
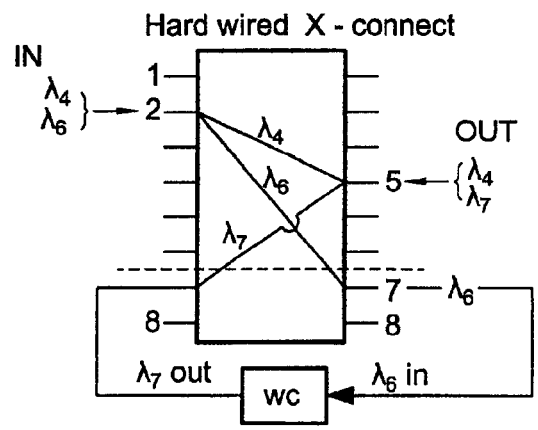
FIG. 8A illustrates where a wavelength converter of the present invention might fit into the FIG. 6A wavelength routing node with reserve band.

When used together, the any-to-one wavelength converter and the one-to-any wavelength converters give complete network flexibility, and enable the progression to the long-sought all optical mesh network. This type of converter or band converter relies on the concept of a reserve band as described in the previously cited Binetti et al., *J. Lightwave Technology*, vol. 18, no. 2, February 2000, pp. 144–153. FIG. 8A illustrates this concept according to the present invention by which the wavelength converter operates with a passive wavelength routing node or switch, as illustrated in FIG. 6A.

Reserve Band Wavelength Converter

In a typical network, blocking does not typically become a problem until 80% of the channels are being used. A non-blocking architecture can then be created by selecting a small subset, say 20% or even less, of the available ITU grid channels for reserve. The wavelength converters of the present invention are readily adapted for these functions.

Figure 1A:
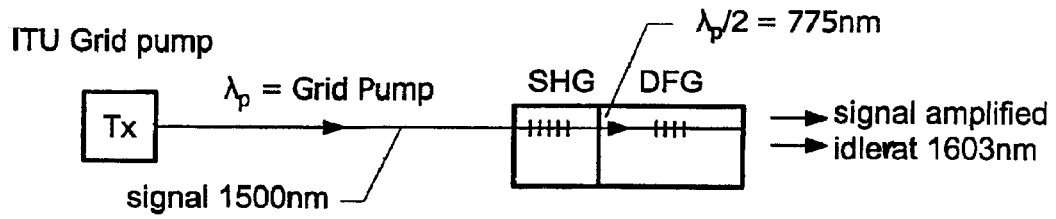
FIG. 1A is a block diagram of a wavelength converter arrangement according to the prior art, which includes an optical chip with waveguide containing a poled region which frequency doubles an input pump, then difference frequency mixes that doubled pump with an external optical signal to convert that signal to a new wavelength called the idler. This device can also be thought of as an optical parametric amplifier (OPA)
Figure 1B:
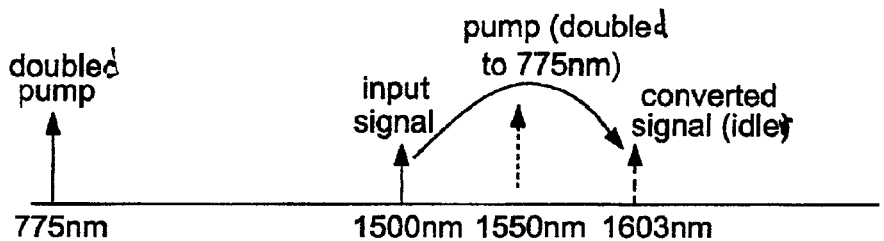
FIG. 1B is a wavelength representation of the operation of the FIG. 1A OPA arrangement.
Figure 8B:
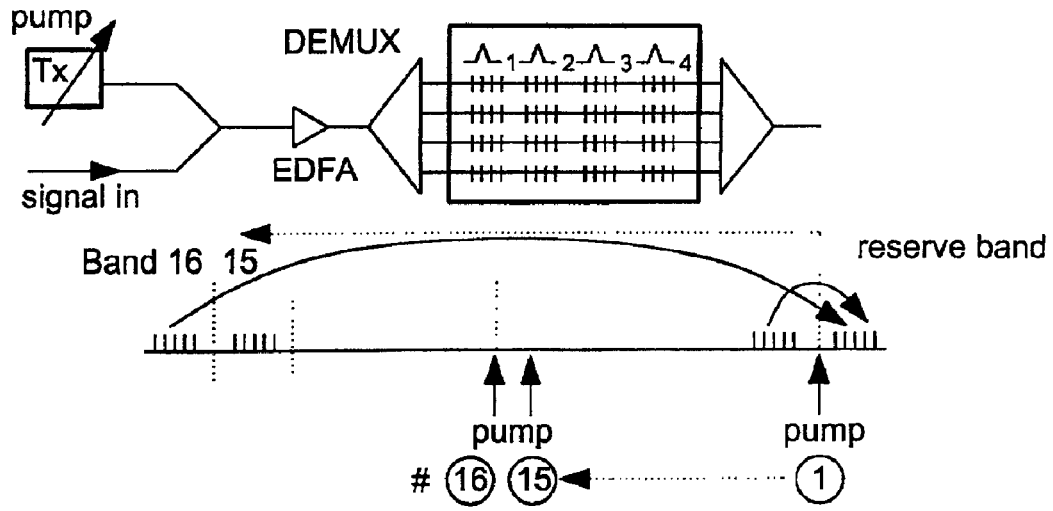
FIG. 8B illustrates in block diagram form one embodiment of a FIG. 8A wavelength converter.
Figure 8C:
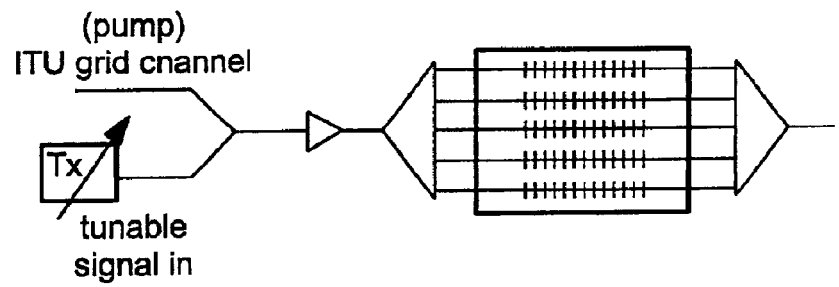
FIG. 8C illustrates another wavelength converter.
Figure 9:
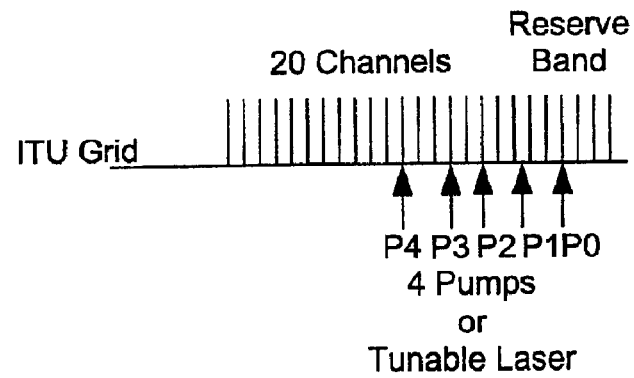
FIG. 9 illustrates how only four pump wavelengths can be used to shift any signal channel into or out of a reserve band with a wavelength band converter according to the present invention.

Any wavelength or band of wavelengths can be shifted into the reserve band using the wavelength converter arrangements shown in FIGS. 8B and 8C together with the waveguide technology described with respect to FIGS. 1A and 1B wherein the input signals are converted about a tunable input pump. A single waveguide with multiple gratings as described in the cited Chou et. al. articles may be employed. With a reserve band of 5 channels, only 4 pump wavelengths (and associated gratings) are required to shift between 20 channels, as shown in FIG. 9. In this architecture, any blocked wavelength is shifted to one of the reserve band channels. The reserve band is left open to accept these wavelengths to avoid blocking.

Figure 10A:
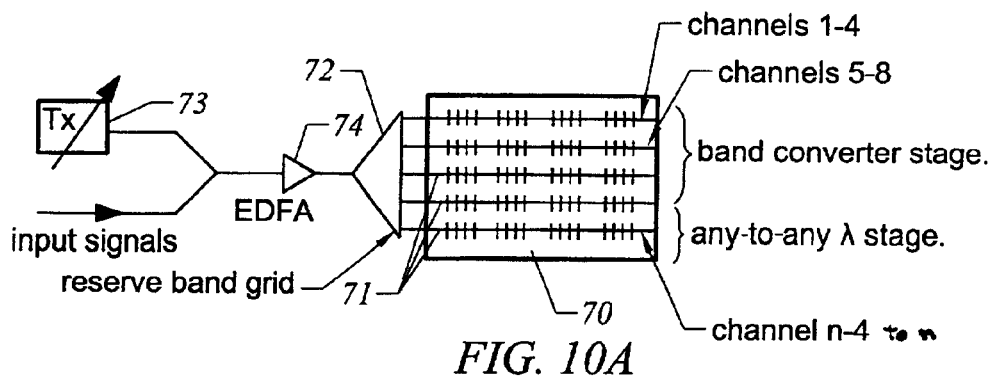
FIG. 10A is a block diagram of a wavelength converter handling 80 channels with a reserve band.

In fact, the existing 80 channels in the C-band can be covered in the same way by adding up to 16 pump wavelengths and resonant gratings, as shown in FIG. 10A. A single tunable pump can accommodate all these channels. If four gratings are employed in each waveguide, then only four waveguides would be required to enable band conversion of all 80 channels into the five channel reserve band. The multiple gratings can also be fabricated as a Fourier synthetic grating, as described in Chou et. al., in which case all the gratings occupy the same length of waveguide (i.e., they overlap).

Figure 10B:
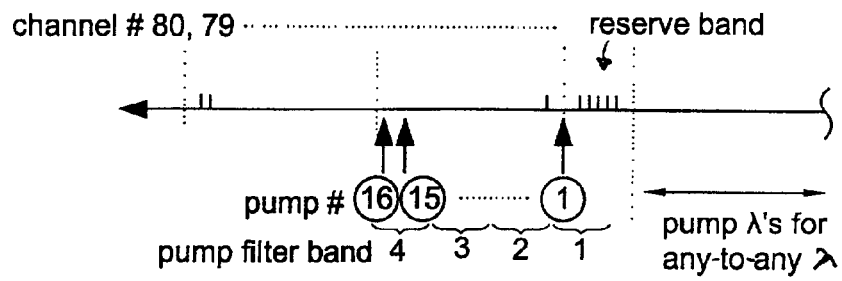
FIG. 10B illustrates the shifting operations of the FIG. 10A converter.

In this embodiment, the DWDM demultiplexer 72 must separate input signal channels in groups of 5, and pump wavelengths in groups of 4. For example, the first demultiplexer filter must direct channels 1 through 20, and pump wavelengths 1 though 4 to the first waveguide. Filtering can be optimized by appropriate channel count; i.e., channel grouping and pump selections may be varied. FIG. 10B illustrates the shifting operation of the FIG. 10A wavelength converter.

Nonblocking All-Optical Network Architecture

Figure 11A:
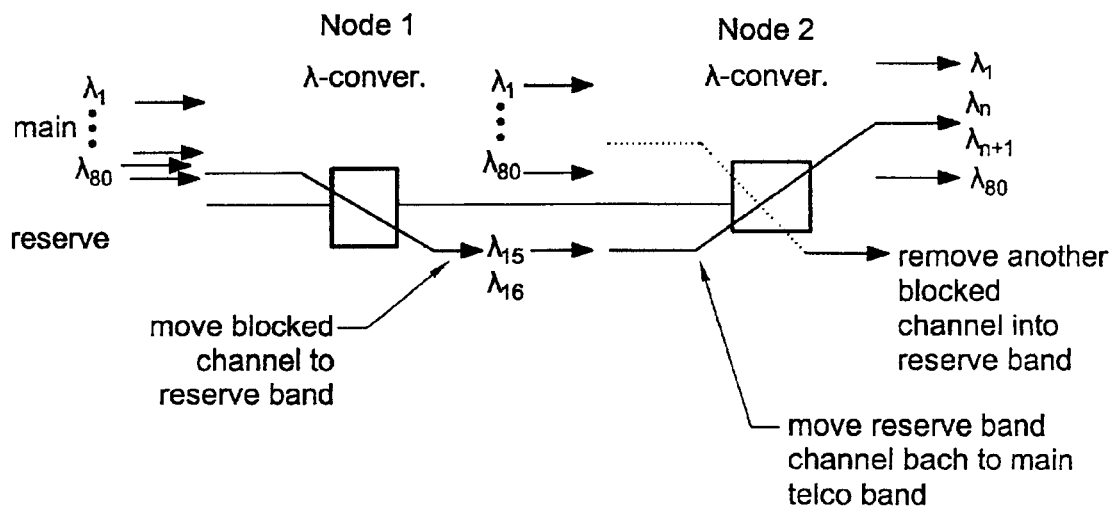
FIGS. 11A–11C illustrate the operation of a wavelength converter with a reserve band to prevent blocking at a node in an all-optical network.
Figure 11B:
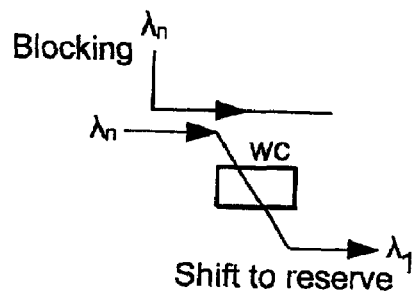
Figure 11C:
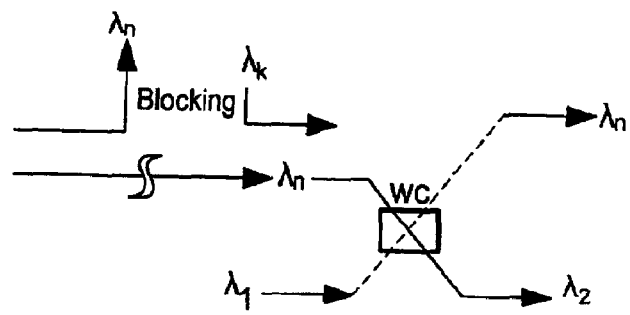

In an all-optical network architecture, as shown in FIG. 11A, at a first node, the blocked channel(s) are shifted into the reserve band then continues propagation through the network. Once the blocked channel signals reach another node, the reserve band can be cleared with 100% flexibility to any other channel. For example, if channel $\lambda_n$ is present in two fibers which are required to be switched into one, then $\lambda_n$ is blocked. The wavelength converter shifts $\lambda_n$ onto the reserve band channel $\lambda_{15}$, which propagates to the next node (add/drop multiplexer). At this node, the other $\lambda_n$ is directed elsewhere, leaving $\lambda_n$ open again. However, a new channel $\lambda_k$ needs to be added and $\lambda_k$ already exists in the original input fiber; therefore, simultaneously with $\lambda_n$ being shifted back into the main channel set, $\lambda_k$ is shifted onto the reserve band, possibly onto the same channel that $\lambda_n$ previously occupied.

Any-to-Any Wavelength Converter

Once a blocked channel is shifted into the reserve band, the second embodiment as described with respect to FIGS. 5A and 5B can be used to shift the reserve channel to any other channel. Thus by using only two pumps, the present invention converts any wavelength to any other wavelength, a highly significant result.

Figure 12A:
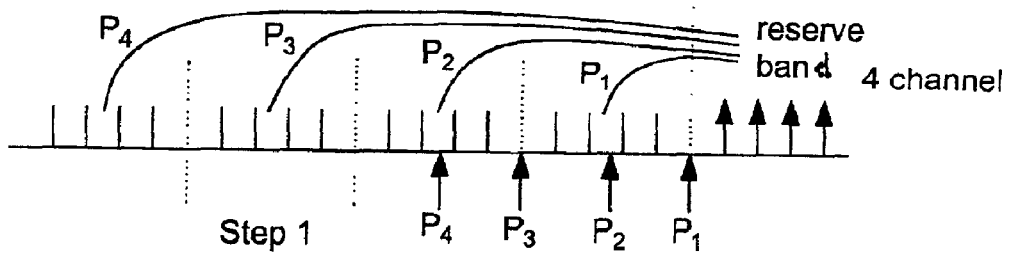
FIG. 12A illustrates the first shifting step of the wavelength converter represented by the operations of FIGS. 11A–11C.
Figure 12B:
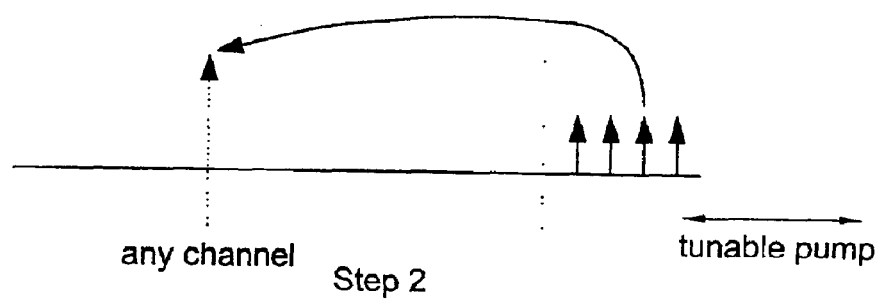
FIG. 12B illustrates the second shifting step of the wavelength converter.

The required shifts are shown schematically by steps illustrated in FIGS. 12A and 12B, for a 16 channel system with 4 reserve bands. This embodiment can readily be implemented with only 2 waveguides, each containing 4 superimposed gratings (plus the frequency doubler for the pump wavelength). At present, 4 gratings have been demonstrated to function independently and with sufficiently high gain. It is expected that higher grating counts will be developed and employed in the future. However, this embodiment of the present invention scales to any number of channels, either by adding gratings of more waveguides.

Figure 13:
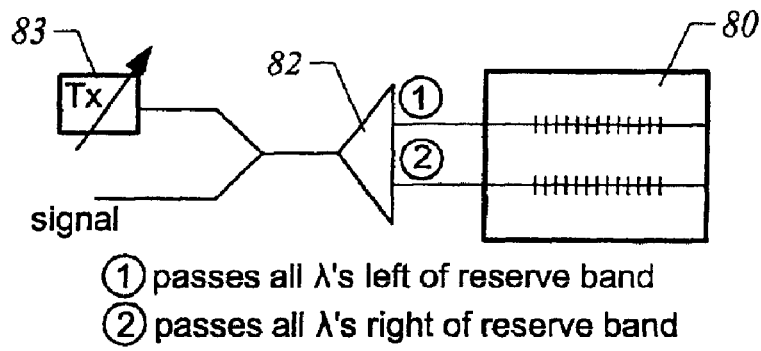
FIG. 13 is a block diagram of an embodiment of wavelength converter which can perform the previous shifting operations, according to the present invention.

This arrangement is shown in FIG. 13, and can also be configured with all 5 resonant gratings in a single waveguide. In fact, this stage may be incorporated onto the same chip as the first stage, in order to make a common device for easy of manufacturing and cost scaling. In this case, the demultiplexer 82 has an additional filter which directs any channel in the reserve band into the any-to-any wavelength section of the reserve band converter. Likewise, the filters directing the pump wavelength must also accommodate the wavelengths for converting the reserve band to any other channel. Since these pump (signal) wavelengths lie to the right of the reserve band as in FIG. 12, they are easily separated and directed to the any-to-any wavelength converter waveguide.

Figure 14A:
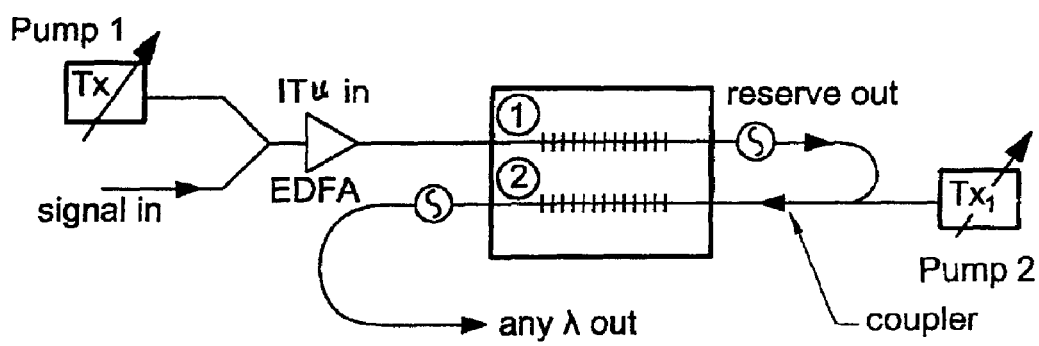
FIG. 14A is a block diagram of another wavelength converter which can perform the shifting operations with two pump sources.

A device can be fabricated as shown in FIG. 13, which makes it identical for either function and thereby simplifies production scaling. Alternately, the complete two-stage device can be configured in a single chip with 2 pumps, as shown in FIG. 14A. Since the pumps for the reserve band shifting to any other wavelength are known and fixed, it is possible to used 4 fixed wavelength pumps to drive this conversion. The advantage of this scheme is the ability to convert two or more reserve bands simultaneously. The disadvantage is cost and complexity. Tunable optical pumps of the type made by Agility, Inc. of Santa Barbara, Calif. are expected to be comparable in cost to fixed-wavelength pumps and to render tunable pump preferable. A present concern is whether sufficient tuning speed can be achieved.

Figure 14B:
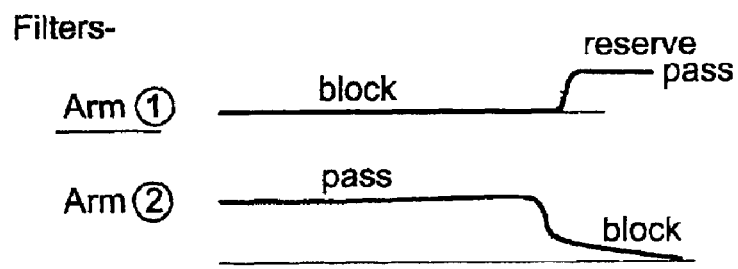
FIG. 14B illustrates the filtering operations in the arms of the FIG. 14A wavelength converter.

The use of only two pumps dramatically reduces the cost of wavelength conversion, and simplifies operation, enabling the embodiment shown in FIG. 14A. The filtering required to remove the original signal wavelengths and introduced pumps, is also very simple. On the first arm where signals are transferred into the reserve band, filters pass only the reserve band. On the second arm, where the reserve band is shifted to any other wavelength, the filters block the reserve band and pass only the signal bands. These filtering operations are represented in FIG. 14B. Amplification is also easy, with only a single EDFA, since in the second arm it is not necessary for the input signal to be amplified (an ITU grid transmitter is already 10–100× stronger than a typical ITU grid channel).

It is important to note that while the number of input wavelengths that can be shifted to the reserve band is limited by the number of gratings and pumps employed, the number of wavelengths to which the reserve band can be shifted is not limited. The reserve band can be shifted to any wavelength provided the tunable pump can tune to the required signal wavelength. It is also interesting to note that the wavelength shift can be to a region to switch the tunable pump itself is not capable of tuning, by virtue of the "mirror" nature of the converter.

Any-to-Any Wavelength Converter With a Single Tunable Laser

Figure 15A:
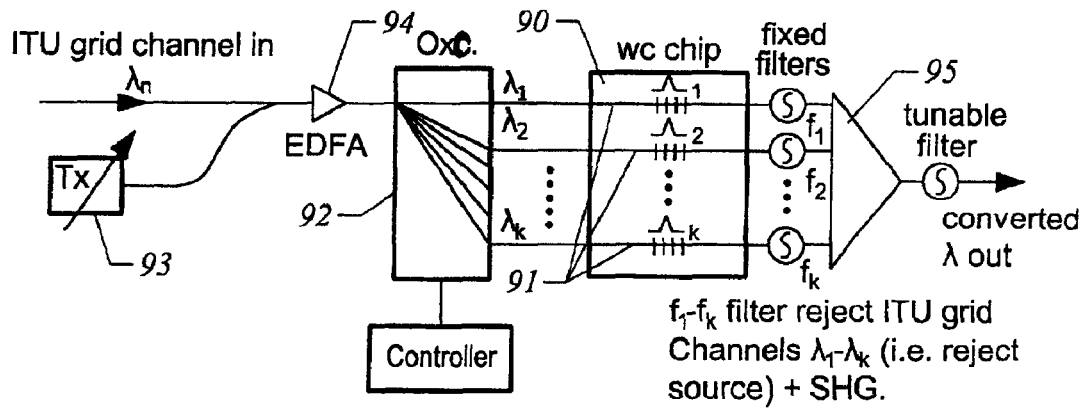
FIG. 15A is a block diagram of an any-to-any wavelength converter with only one tunable pump source, according to still another embodiment of the present invention.

Finally, the embodiment shown in FIG. 15A represents an any-to-any wavelength converter which uses only a single tunable laser source 93. In this embodiment, the ITU grid channel input is used to act as the pump source, and the tunable laser 93 acts as the signal. An OXC (optical switch) 92, or linear optical switch array, directs the combined signal and pump into the appropriate waveguide 91 which contains the grating (or synthetic grating(s)) needed to resonate with the signal wavelength being used. This embodiment also has the advantage of noise reduction through the conversion process, as explained previously.

Figure 15B:
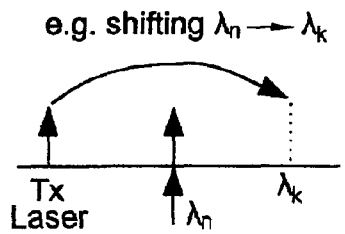
FIGS. 15B and 15C illustrate shifting operations of the FIG. 15A wavelength converter.
Figure 15C:
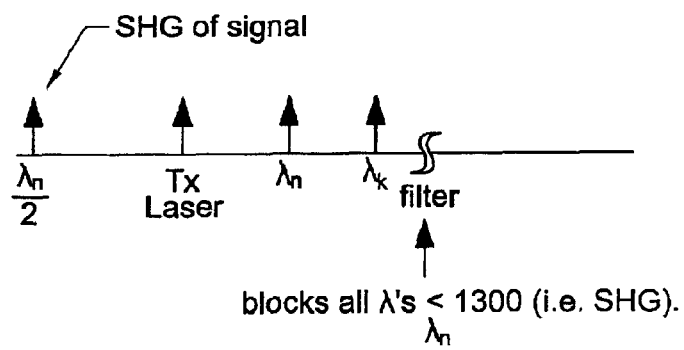

FIGS. 15B and 15C are some illustrative operations of the FIG. 15A wavelength converter.

Polarization Independent Arrangements

Figure 16A:
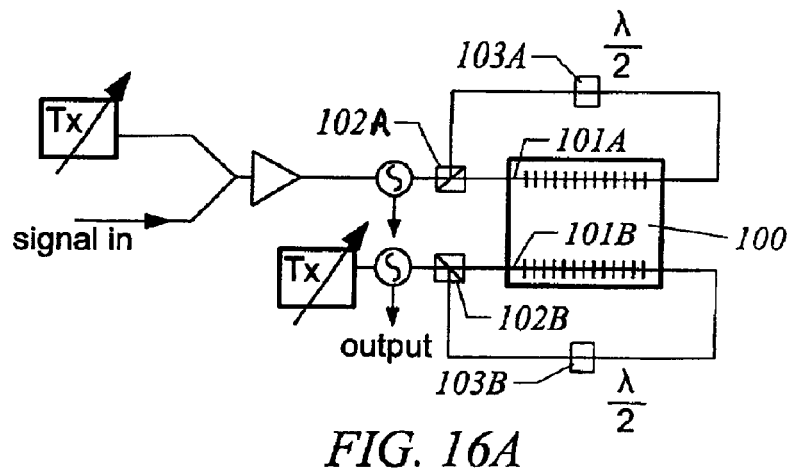
FIG. 16A is a block diagram of a polarization-independent wavelength converter according to another embodiment of the present invention.

FIG. 16A shows the two-stage converter configured for polarization independence of the input channels. Two loop arms are formed by waveguides 101A and 101B in a chip 100 with polarization splitters 102A, 102B and half-waveplates 103A and 103B. Each polarization splitter 102A, 102B separates the pump and input signals by their two-orthogonal polarization components and the half-waveplates 103A and 103B rotate one component by 90°. Wavelength conversion occurs for the counter-propagating beams in each arm.

Figure 16B:
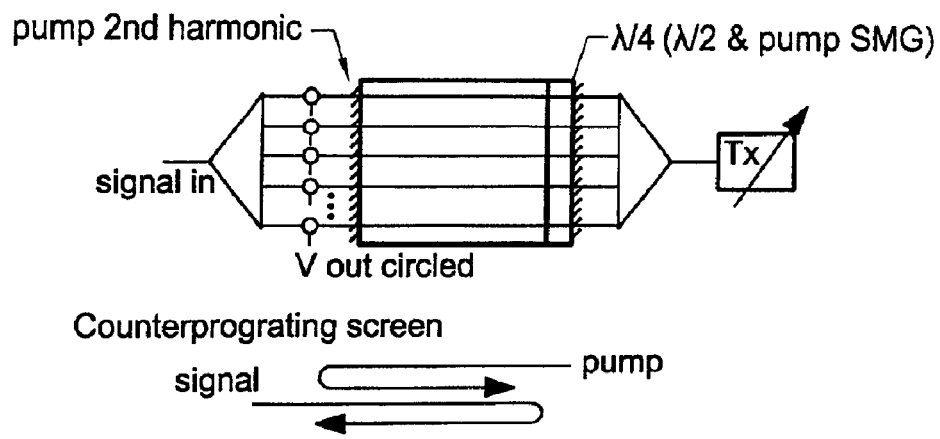
FIGS. 16B and 16C are block diagrams of alternative embodiments of polarization-independent wavelength converters according to the present invention.
Figure 16C:
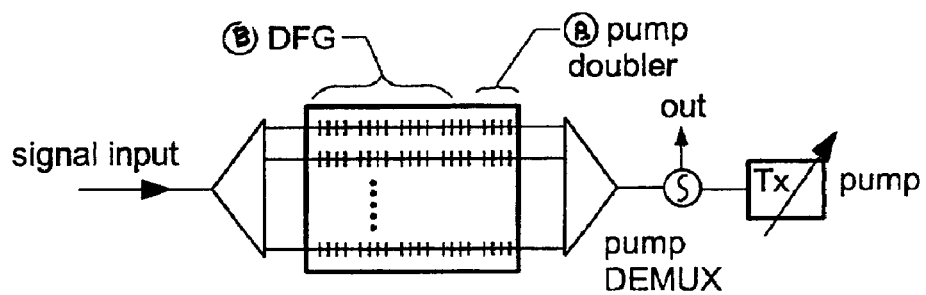

FIGS. 16B and 16C show alternate polarization-insensitive embodiments using counter-propagating signals and pump inputs with quarter wave rotation on the signals (and half wave on the pump), and mirrored faces.

Enhanced Noise Performance

Figure 17:
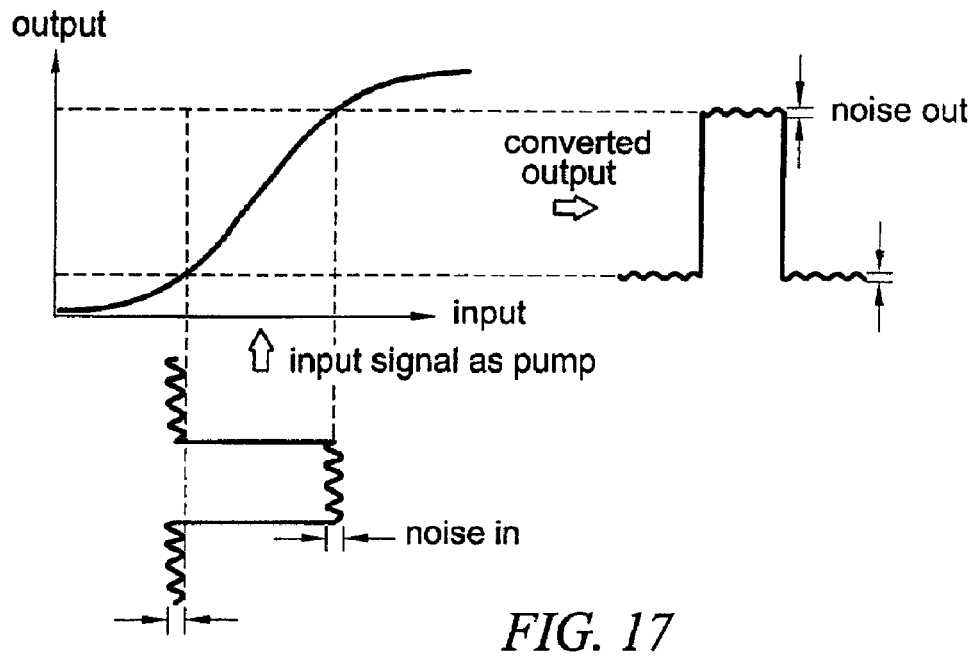
FIG. 17 illustrates the wavelength conversion characteristics of the wavelength converters of the present invention.

Finally, the present invention offers a nonlinear device with the conversion characteristics shown in FIG. 17. Prior-art embodiments of this type of device (such as described in the previously cited Chou et al. articles) describe highly linear correlation between input signal and converted output over several orders of magnitude of signal power. An advantage of this embodiment of the present invention over the prior art, is suppression of noise.

The reversal of the traditional roles of pump and signal means that the signal is frequency doubled and then drives the wavelength conversion process. Frequency doubling efficiency increases quadratically with input signal until reaching a linear regime. The wavelength conversion process can occur by the traditional method of difference frequency generation, or by another method called sum-frequency generation (SFG). The latter process depletes the input signal and pump to create the sum frequency, and is a more general case of frequency doubling. This process scales as the product of the signal and pump intensity, and saturates as either is depleted. Combining these processes in series produces the nonlinear transfer function shown in FIG. 17, which can be used for noise clean-up or optical regeneration. Referring to FIG. 17, there are three distinct operation regions for the present invention. For very low signal inputs, the device operates in a sub-threshold regime, wherein conversion efficiency is negligible and converted output is several orders of magnitude below input. As signal input strength increases, linear gain is encountered. Finally at the high signal level input, saturation is reached where the amplification of the input signal and generation for the converted wave deplete the input pump.

The nonlinear transfer function is achieved in a number of ways. Most simply, pump saturation causes noise reduction on the peaks of telecom pulses but not the troughs. This is accomplished simply by selecting a high gain by length of the PPLN chip and a lower pump power relative to the signal input (typically signal >0.1 pump will achieve this condition).

The gain of the device and input power level of the pump and signal determine which of these regimes the device operates within. The pump power can be adjusted independently of the signal level; and the power levels of both are controlled by the gain of the EDFA. Thus the device can be set up for a particular location in the network wherein the input signal levels are known and calibrated for same. Regenerators are employed only after the signal has become sufficiently weak or noise ridden. The gain of the device is determined by its length and poling characteristics. A higher gain will result in a faster transition from threshold to saturation, thus selection of gain determines the dynamic range of the devices linearity with input signal.

After the device is adjusted to be linear only over the peak-to-valley height of the signal input pulses in that part of the network (by selecting gain, pump power and EDFA amplification factor), noise reduction and filtering through nonlinearity can be performed. Again, with respect to FIG. 17, the input pulse is now converted by the wavelength converter, but this time, the noise between pulses lies in the intensity regime below threshold so that conversion of the noise between pulses or at the peak of the pulse falls into the reduced efficiency regimes thus attenuated noise. The converted wave is thus "regenerated" in that it is amplified with reduced noise characteristics.

Reduced EDFA ASE Noise

When an EDFA amplifies a telecommunications signal, it adds inherent noise to the output due to amplified spontaneous emission (ASE). A weak input signal at a particular wavelength is amplified, but a minimum of 3 dB additional "noise" is added to the signal and to all wavelengths around the signal within the gain band of the EDFA (usually the entire C-band). Furthermore, any noise on the input signal itself is also amplified. Thus each EDFA in a system further degrades the signal to noise ratio S/N until OEO regeneration is required.

In the second stage wavelength converter of the present invention, the amplified noise on the pump lies below the intensity threshold of the doubler section of the wavelength converter, and also resides outside the resonance band of the doubler grating. As a result, the ASE noise is not converted, and therefore the EDFA can add gain without additional ASE noise, even at very high gain factors. This gives a fundamental signal to noise ratio advantage and brings this invention closer to an all-optical regenerator.

Interferometric Wavelength Converter

Figure 18:
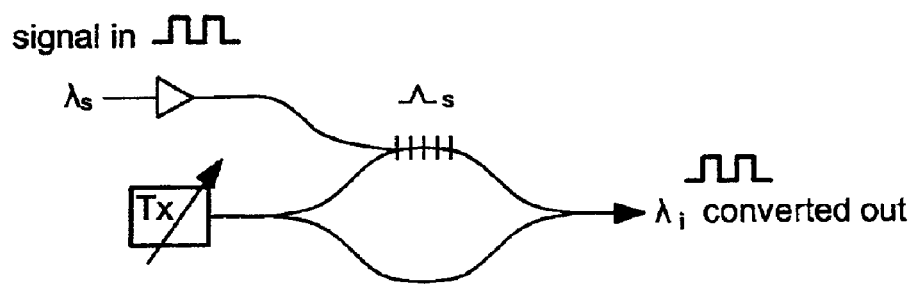
FIG. 18 is a diagram of another embodiment of the present invention, a one-to-any wavelength converter employing a Mach-Zehnder interferometer.

FIG. 18 shows a one-to-any wavelength converter employing a Mach-Zehnder interferometer with a periodically poled region in one arm. The interferometer is balanced, such that in the absence of other input, the light input from the tunable transmitter destructively interferes at the output of the Mach-Zehnder interferometer. When a signal is input into the second port, and optionally amplified, it interacts with the poled region which has been tailored for that wavelength. The signal acts as a pump for the wavelength converter. The difference frequency generation process both converts the tunable transmitter wavelength to its "mirror image" around the second harmonic of the pump, and also amplifies the original channel. The increased power in one arm of the Mach-Zehnder unbalances the interferometer, and enables output at the transmitter wavelength. Since the wavelength conversion only takes place when power is present at the signal wavelength, then the modulation of the signal is replicated on the transmitter output. Since the wavelength conversion process first frequency doubles the signal and then uses it as a pump, and since the doubling process is non-linear, the noise on the "zeros" of the signal data is suppressed, resulting in an enhanced signal to noise ratio of the transmitter output with respect to the input signal. Further, since the wavelength converter is operating in amplification mode, the noise figure for the process is substantially reduced over that of the usual wavelength conversion (or difference frequency generation) mode. Firstly, the amplification process has a noise figure below 3 dB (and in-fact is zero for unity gain—i.e., no amplification), compared to the wavelength conversion process whose noise figure is larger because it is creating a new wavelength from nothing against a quantum noise background. In this process, any noise is being added to a strong transmitter so that the ratio of signal to noise is substantial higher than in the wavelength conversion case. Thus this device performs signal cleanup or optical regeneration of the original data.

Any-to-Any Interferometric Wavelength Converter

Figure 19:
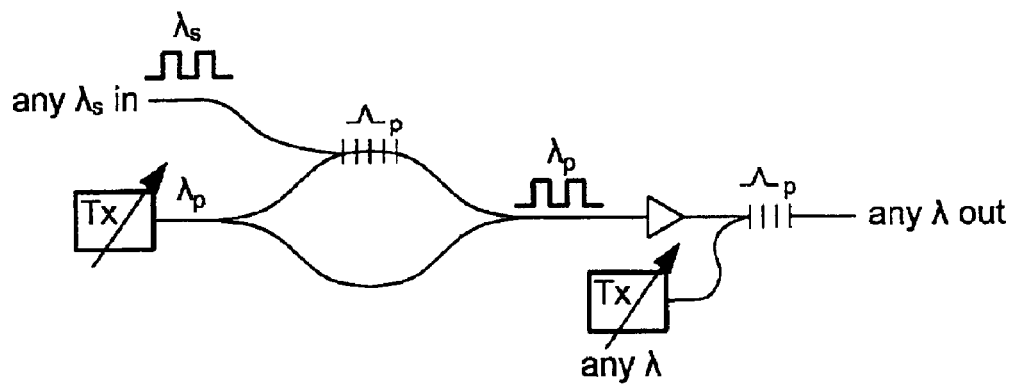
FIG. 19 is a diagram of another interferometric wavelength converter of the present invention, which can perform any-to-any wavelength conversion.

In another embodiment of the present invention, the interferometric wavelength converter described above performs any-to-any wavelength conversion. In this case, shown in FIG. 19, a similar interferometric design is employed to that shown in FIG. 18. However, the transmitter is fixed wavelength and acts as a pump, resonant with the poled structure in one arm of the interferometer. Due to the broad bandwidth of the DFG process, any wavelength can be input to the other port, and will interact with the pump, producing depletion of the pump signal in that arm. The pump depletion unbalances the interferometer allowing pump output to occur, thereby transferring modulation from the input signal to the pump wavelength. The pump then interacts with a second poled region, after optional amplification, and a second transmitter, this time tunable, is input and produces wavelength converted output through the usual difference frequency generation process.

Therefore, while the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An one-to-any wavelength converter comprising:

an optical chip with a plurality of waveguides;

a CW laser, input to at least one of said waveguides;

a $2^{nd}$ input port accepting an external optical signal, modulated with data;

a plurality of periodically poled regions within said waveguides having a plurality of different resonant wavelengths; and a means for selectively directing said external optical signal into a waveguide containing the periodically poled regions that is resonant with said external optical signal.

2. The one-to-any wavelength converter of claim 1, wherein the CW laser is tunable.

3. The one-to-any wavelength converter of claim 1, including a filter on an output of the waveguide which removes the signal wavelength.

4. The one-to-any wavelength converter of claim 1, wherein said selectively directing means comprises a plurality of external optical filters.

5. The one-to-any wavelength converter of claim 1, comprising:

N waveguides; and wherein said selectively directing means comprises:

a 1×N optical switch which selectively directs the external optical signal, and the CW laser output into the waveguide containing the poled region that is resonant with the external optical signal.

6. A one-to-any wavelength converter comprising:

an optical chip with a plurality of waveguides joined together end to end to form a continuous waveguide;

a plurality of poled regions within said waveguides with a plurality of different resonant wavelengths;

a CW laser, input to one of said waveguides; and a second input port accepting an external optical signal modulated with data.

7. A one-to-any wavelength converter, comprising:

an optical chip with a plurality of waveguides;

a tunable CW laser, used as a pump to energize the optical chip;

an input port accepting an external optical signal, modulated with data;

at least one periodically poled region, within each waveguide, with at least one resonant wavelength; and an optical switch which selectively directs both the CW pump and the external optical signal into the waveguide with the poled region whose resonant wavelength matches that required to achieve a pre-determined optical shift.

8. The one-to-any wavelength converter of claim 7 having a filter on the output of each waveguide which removes a pump wavelength resonant with the poling structure within that waveguide.

9. The one-to-any wavelength converter of claim 7, including an optical amplifier on the input port.

10. The one-to-any wavelength converter of claim 7, including an external controller that accepts an external input to determine the required optical shift, with a pre-determined switching algorithm that tunes the CW laser, and operates the optical switch, so as to direct the CW laser and external optical signal into the appropriate waveguide to achieve the required shift.

11. An any-band-to-any-band wavelength converter comprising:

a plurality of waveguides;

a plurality of poled regions with a plurality of different resonant wavelengths;

an optical switch which selectively directs both a CW pump and an external optical signal into the waveguide with the poled region whose resonant wavelength matches that required to achieve a pre-determined optical shift, and an input port accepting a plurality of external optical signals simultaneously, and an output port producing a plurality of converted optical signals simultaneously.

12. An any-to-one wavelength converter, comprising:

a plurality of waveguides;

a plurality of poled regions with a plurality of different resonant wavelengths; and means for selectively directing both a CW pump and an external optical signal into the waveguide with the poled region whose resonant wavelength matches that required to achieve a pre-determined optical shift to a fixed output wavelength.

13. The any-to-one wavelength converter of claim 12, wherein said selectively directing means comprises:

a series of optical filters on an input, which direct the external optical signal and CW pump to the waveguide with the resonant wavelength required to shift the external optical signal input wavelength to the fixed output wavelength.

14. The any-to-one wavelength converter of claim 12, including:

a series of filters on an output which recombines the fixed output wavelengths into an output port, and rejects all other wavelengths.

15. The any-to-one wavelength converter of claim 12 wherein said selectively directing means comprises an optical switch.

16. An any-to-any wavelength converter comprising:
an one-to-any wavelength converter of claims 1 or 7, and
an any-to-one wavelength converter of claim 12.

17. An any-to-any wavelength converter, comprising:
an optical chip with a plurality of waveguides;
a tunable CW laser, used as a pump to energize the optical chip;
an input port accepting an external optical signal, modulated with data;
at least one periodically poled region, within each waveguide, with at least one resonant wavelength; and
an optical switch which selectively directs both the CW pump and the external optical signal into the waveguide with the poled region whose resonant wavelength matches that required to shift the wavelength of the external optical signal to a pre-determined output wavelength.

18. The any-to-any wavelength converter of claim 17, including filters on each waveguide output that reject the pump wavelength resonant with the poled region within that waveguide.

19. The any-to-any wavelength converter of claim 17, including an external controller with a routing algorithm to accept an input giving a desired output wavelength from a given input wavelength, and determine which waveguide and resonant wavelength is required to shift the given input wavelength to the desired output wavelength, then control the optical switch to select the appropriate waveguides, and tune the CW laser wavelength to the required resonant wavelength.

20. An any-to-any wavelength converter, comprising:

a tunable CW laser, used as a pump to energize an optical chip;

an input port accepting an external optical signal, modulated with data;

a plurality of waveguides, joined together end to end to form a continuous waveguide;

a plurality of poled regions with a plurality of different resonant wavelengths; and an external controller which tunes the wavelength of the CW laser to the resonant wavelength required to achieve a pre-determined shift of the external optical signal to a required output wavelength.

21. A network architecture employing at least one of the one-to-any wavelength converter of claims 1 or 7, or the any-to-one wavelength converter of claim 12, or the any-to-any wavelength converter of claim 17 or 20.

22. A network architecture in which channels are routed by selection of wavelength, in which a network path is changed by changing wavelength using at least one of the one-to-any wavelength converter of claims 1 or 7, or the any-to-one wavelength converter of claim 12, or the any-to-any wavelength converter of claims 17 or 20.

* * * * *